US012695751B2

(12) United States Patent
Chifamba et al.

(10) Patent No.: US 12,695,751 B2
(45) Date of Patent: ***Jul. 28, 2026

(54) SYSTEM, METHOD, AND COMPUTER PROGRAM PRODUCT FOR CONTROLLING ACCESS TO ONLINE ACTIONS

(71) Applicant: Visa International Service Association, San Francisco, CA (US)

(72) Inventors: Robert Chifamba, Austin, TX (US); Krishnaram Muthusamy, Austin, TX (US)

(73) Assignee: Visa International Service Association, San Francisco, CA (US)

( * ) Notice: Subject to any disclaimer, the term of this patent is extended or adjusted under 35 U.S.C. 154(b) by 47 days.

This patent is subject to a terminal disclaimer.

(21) Appl. No.: 18/978,125

(22) Filed: Dec. 12, 2024

(65) Prior Publication Data

US 2025/0112922 A1 Apr. 3, 2025

Related U.S. Application Data

(63) Continuation of application No. 17/704,226, filed on Mar. 25, 2022, now Pat. No. 12,206,667, which is a
(Continued)

(51) Int. Cl.
| | |
|---|---|
| *H04L 29/06* | (2006.01) |
| *G06F 17/18* | (2006.01) |
| *H04L 9/40* | (2022.01) |

(52) U.S. Cl.
CPC .......... *H04L 63/0892* (2013.01); *G06F 17/18* (2013.01); *H04L 63/083* (2013.01); *H04L 63/0884* (2013.01)

(58) Field of Classification Search
CPC ............... H04L 63/083; H04L 63/0884; H04L 63/0892; G06F 17/18
See application file for complete search history.

(56) References Cited

U.S. PATENT DOCUMENTS

| | | | |
|---|---|---|---|
| 8,032,896 B1 | 10/2011 | Li et al. | |
| 9,781,152 B1 * | 10/2017 | Mistratov | ............. G06F 21/577 |

(Continued)

OTHER PUBLICATIONS

Yuan Wang et al., Bot-like Behavior Detection in Online Banking, May 2019, ACM, pp. 140-144. (Year: 2019).*
(Continued)

*Primary Examiner* — Luu T Pham
*Assistant Examiner* — Fahimeh Mohammadi
(74) *Attorney, Agent, or Firm* — The Webb Law Firm

(57) ABSTRACT

Provided are computer-implemented methods that may include receiving, via a communication network, a request to perform an online action from a user device; retrieving data associated with a number of times the user device performed the online action within at least one time interval; determining whether a dataset associated with a number of times a plurality of user devices have performed the online action within the at least one time interval is normally distributed; and determining a standard deviation associated with the number of times the user device performed the online action within the at least one time interval in response to determining that the dataset is normally distributed, and performing a control operation associated with the request to conduct the online action based on a threshold of standard deviation. Systems and computer program products are also provided.

17 Claims, 14 Drawing Sheets

100

Related U.S. Application Data continuation of application No. 16/781,028, filed on Feb. 4, 2020, now Pat. No. 11,303,637.

(56) References Cited

U.S. PATENT DOCUMENTS

| | | | |
|---|---|---|---|
| 10,027,694 B1 | 7/2018 | Gupta et al. | |
| 2011/0239278 A1* | 9/2011 | Downey | H04L 63/083 |
| | | | 726/4 |
| 2015/0295913 A1* | 10/2015 | Foote | G06F 21/31 |
| | | | 726/6 |
| 2017/0134362 A1 | 5/2017 | Randall et al. | |
| 2017/0346809 A1* | 11/2017 | Plotnik | H04L 63/123 |
| 2017/0346821 A1* | 11/2017 | Yedidi | H04L 63/0884 |
| 2018/0115631 A1* | 4/2018 | Martin | H04L 67/306 |
| 2018/0288026 A1* | 10/2018 | Callaghan | H04L 9/3226 |
| 2019/0190934 A1* | 6/2019 | Peppe | H04L 63/1441 |
| 2020/0136816 A1* | 4/2020 | Prasad Nittur | H04L 9/088 |
| 2020/0137066 A1* | 4/2020 | Erickson | H04L 9/3226 |
| 2020/0177615 A1* | 6/2020 | Grabois | H04L 63/20 |
| 2020/0382534 A1* | 12/2020 | Simanovsky | G06F 21/552 |
| 2021/0203675 A1* | 7/2021 | Kaidi | G06F 21/46 |

OTHER PUBLICATIONS

Lívia C. F. Araújo et al., User Authentication Through Typing Biometrics Features, Jan. 17, 2005, IEEE, vol. 53, Issue: 2, pp. 851-855. (Year: 2005).*

Dorothy E. Denning, An Intrusion-Detection Model, Feb. 1987, IEEE, vol. SE-13, Issue: 2, pp. 222-232. (Year: 1987).*

Prakash Chandra Mondal et al., Transaction Authorization from Know Your Customer (KYC) Information in Online Banking, Feb. 16, 2017, IEEE, pp. 523-526. (Year: 2017).*

Araujo et al., "User Authentication Through Typing Biometrics Features", IEEE, Jan. 17, 2005, pp. 851-855, vol. 53, Issue 2.

Denning, "An Intrusion-Detection Model", IEEE, Feb. 1987, pp. 222-232, vol. SE-13, Issue 2.

Mondal et al., "Transaction Authorization from Know Your Customer (KYC) Information in Online Banking", IEEE, Feb. 16, 2017, pp. 523-526.

Wang et al., "Bot-like Behavior Detection in Online Banking", ACM, May 2019, pp. 140-144.

* cited by examiner

100

200

202

Storage Component 208

Memory 206

Processor 204

Communication Interface 214

Output Component 212

Input Component 210

300

400

Figure 4B:
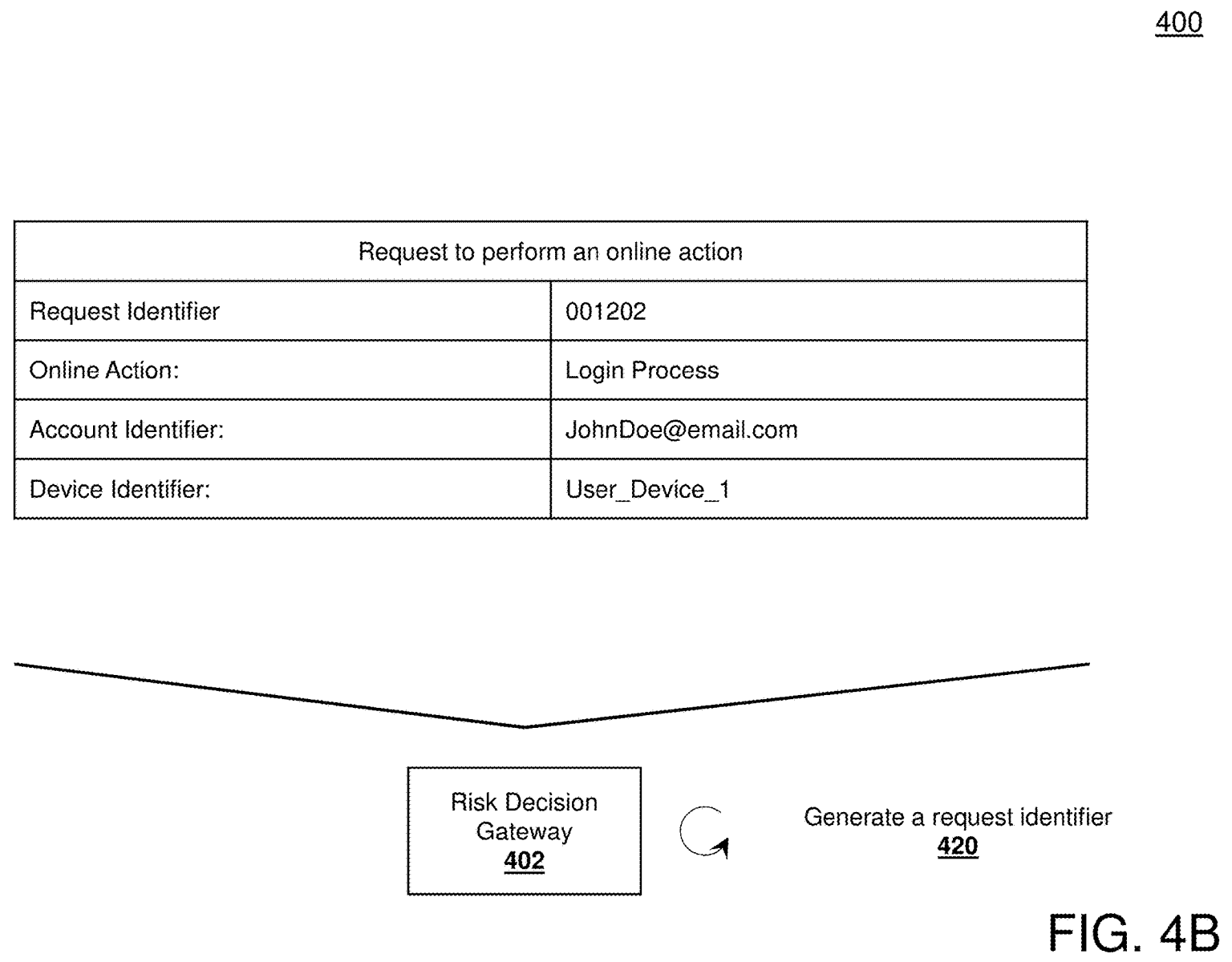

400

| Request to perform an online action | |
|---|---|
| Request Identifier | 001202 |
| Online Action: | Login Process |
| Account Identifier: | JohnDoe@email.com |
| Device Identifier: | User_Device_1 |

Risk Decision
Gateway
402

Generate a request identifier
420

| Request to perform an online action | |
|---|---|
| Request Identifier | 001202 |
| Online Action: | Login Process |
| Account Identifier: | JohnDoe@email.com |
| Device Identifier: | User_Device_1 |

Data Structure

Store the request to perform the online action in a data structure with the request identifier
425

Risk Decision Gateway
402

400

| Request for data associated with a number of times user device performed the online action | |
|---|---|
| Online Action: | Login Process |
| Account Identifier: | JohnDoe@email.com |
| Device Identifier: | User_Device_1 |

Data Structure

Risk Decision Gateway
402

Retrieve data associated with a number of times the online action was performed
430

400

| Request Identifier | 000083 |
| Online Action: | Login Process |
| Account Identifier: | JohnDoe@email.com |
| Device Identifier: | User_Device_1 |

• • •

| Request Identifier | 0001202 |
| Online Action: | Login Process |
| Account Identifier: | JohnDoe@email.com |
| Device Identifier: | User_Device_1 |

Data Structure

Receive the data associated with a number of times the online action was performed
435

Risk Decision Gateway
402

| Number of times user device performed the online action | |
|---|---|
| In last minute | 2 |
| In last hour | 4 |
| In last day | 6 |
| In last week | 10 |

Risk Decision Gateway 402

Calculate values of a number of times user device performed the online action 440

400

400

YES

→

| Request ID | 000001 |
| Online Action: | Login Process |
| Account Identifier: | JonSmith@email.com |
| Device Identifier: | User_Device_28 |

· · ·

| Request ID | 001500 |
| Online Action: | Login Process |
| Account Identifier: | BobJones@email.com |
| Device Identifier: | User_Device_201 |

| Risk Decision Gateway |
| 402 |

↻

Determine whether data associated with a number of times the online action was performed is normally distributed
450

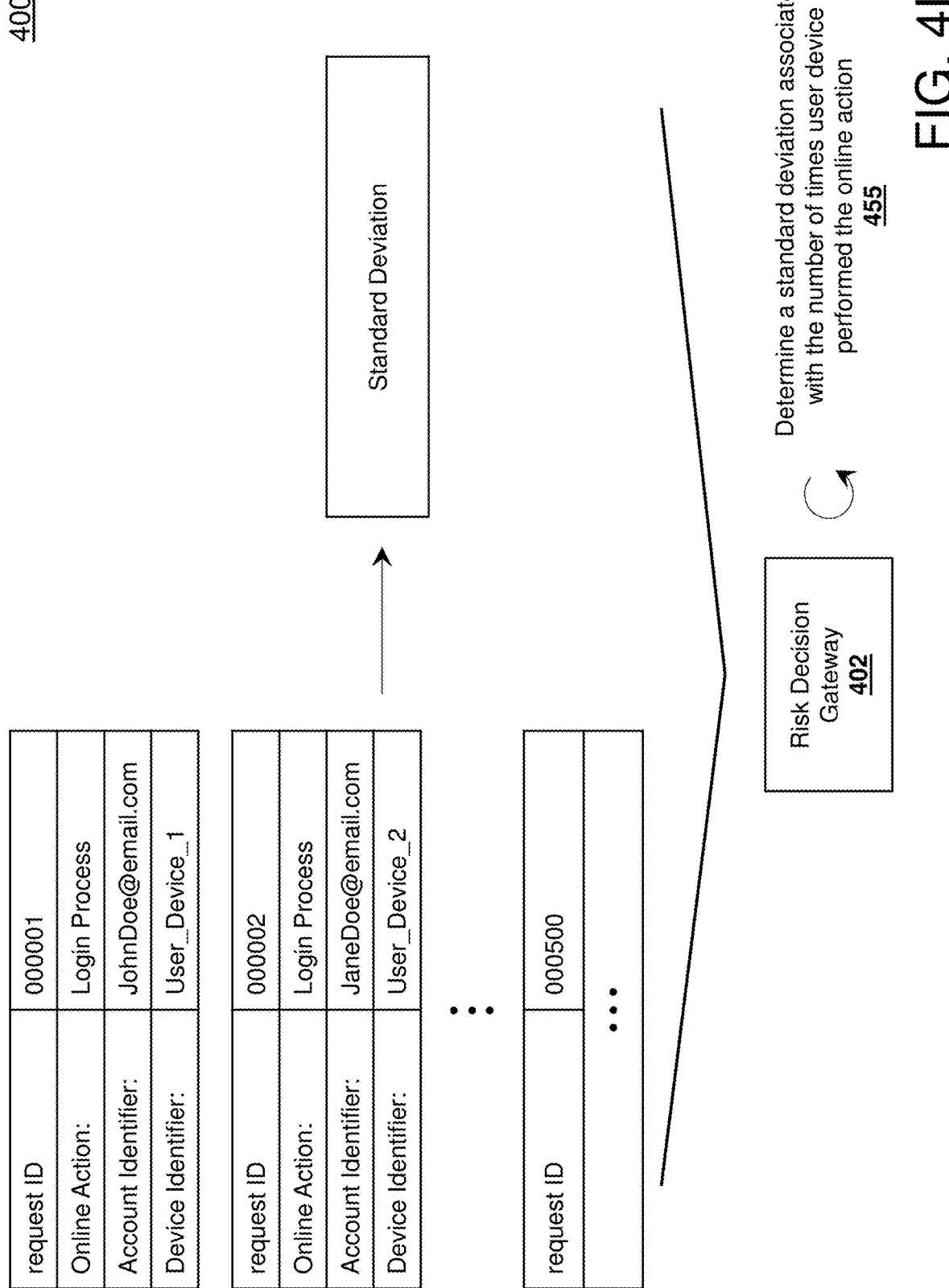

| request ID | 000001 |
| --- | --- |
| Online Action: | Login Process |
| Account Identifier: | JohnDoe@email.com |
| Device Identifier: | User_Device_1 |

| request ID | 000002 |
| --- | --- |
| Online Action: | Login Process |
| Account Identifier: | JaneDoe@email.com |
| Device Identifier: | User_Device_2 |

| request ID | 000500 |
| --- | --- |

Standard Deviation

Risk Decision Gateway
402

Determine a standard deviation associated with the number of times user device performed the online action
455

| Thresholds of Standard Deviation | | Control Operation |
|---|---|---|
| 0 – Standard Deviation | X | Allow |
| Standard Deviation – (2 x Standard Deviation) | | Challenge |
| (2 x Standard Deviation) – (3 x Standard Deviation) | X | Deny |
| (3 x Standard Deviation) – (4 x Standard Deviation) | X | Deny and Blacklist |

Number of times the user device 402 performed the online action

Risk Decision Gateway
402

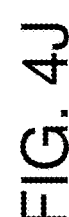

Determine which of a plurality of thresholds of standard deviation corresponds to the number of times user device performed the online action
460

SYSTEM, METHOD, AND COMPUTER PROGRAM PRODUCT FOR CONTROLLING ACCESS TO ONLINE ACTIONS

CROSS REFERENCE TO RELATED APPLICATIONS

This application is a continuation application of U.S. patent application Ser. No. 17/704,226, filed Mar. 25, 2022, which is a continuation application of U.S. patent application Ser. No. 16/781,028, filed Feb. 4, 2020, issued as U.S. Pat. No. 11,303,637, the disclosures of which are incorporated herein by reference in their entireties.

BACKGROUND

1. Field

This disclosure relates generally to controlling access to online actions and, in some non-limiting embodiments or aspects, to systems, methods, and computer program products for controlling access to online actions that may be performed by a user device via one or more control operations.

2. Technical Considerations

To access an online account (e.g., an email account, a banking account, and/or the like), a user may provide data associated with a login to a user device. In some instances, the input may include an email address and a password. The user device may then transmit data associated with the email address and the password to a server (e.g., a server operated by an entity that provides the online account) hosting the online account. The server may receive the data and determine whether or not to permit access to the online account based on the data. For example, the server may determine whether the email address and password match an email address and password stored at the server and the server may permit the user device to access the online account based on determining that there is a match.

In some instances, an entity that operates the online account on behalf of the user may provide an account lockout policy. The account lockout policy may provide a number of times that the user may be able to attempt to access the online account before a control operation is performed, such as a control operation that locks out the user from accessing the online account. In some instances, the number of times that the user may be able to attempt to access the online account is a static value.

However, when the number of times that the user may be able to attempt to access the online account is a static value, the user may be inappropriately locked out of the account. In this way, the user may expend a large amount of time trying to gain access to the online account from which the user was inappropriately locked out of. In addition, a large amount of network resources may be expended between a user device associated with the user and the server that hosts the online account based on the user attempting to access the online account but being unable to obtain access.

SUMMARY

Accordingly, disclosed are systems, methods, and computer program products for controlling access to online actions that may be performed by a user device.

According to some non-limiting embodiments or aspects, provided is a computer-implemented method for controlling access to online actions that may be performed by a user device, the computer-implemented method including: receiving, with at least one processor and via a communication network, a request to perform an online action from a user device; retrieving, with at least one processor, data associated with a number of times the user device performed the online action within at least one time interval; determining, with at least one processor, whether a dataset associated with a number of times a plurality of user devices have performed the online action within the at least one time interval is normally distributed; determining, with at least one processor, a standard deviation associated with the number of times the user device performed the online action within the at least one time interval in response to determining that the dataset is normally distributed; and performing, with at least one processor, a control operation associated with the request to conduct the online action based on a threshold of standard deviation.

According to some non-limiting embodiments or aspects, provided is a system for controlling access to online actions that may be performed by a user device, the system including at least one processor programmed and/or configured to: receive, via a communication network, a request to perform an online action from a user device; retrieve data associated with a number of times the user device performed the online action within at least one time interval; determine whether a dataset associated with a number of times a plurality of user devices have performed the online action within the at least one time interval is normally distributed; determine a standard deviation associated with the number of times the user device performed the online action within the at least one time interval in response to determining that the dataset is normally distributed; and perform a control operation associated with the request to conduct the online action based on a threshold of standard deviation. According to some non-limiting embodiments or aspects, provided is a computer program product for controlling access to online actions that may be performed by a user device, the computer program product comprising at least one non-transitory computer-readable medium comprising one or more instructions that, when executed by at least one processor, cause the at least one processor to: receive, via a communication network, a request to perform an online action from a user device; retrieve data associated with a number of times the user device performed the online action within at least one time interval; determine whether a dataset associated with a number of times a plurality of user devices have performed the online action within the at least one time interval is normally distributed; determine a standard deviation associated with the number of times the user device performed the online action within the at least one time interval in response to determining that the dataset is normally distributed; and perform a control operation associated with the request to conduct the online action based on a threshold of standard deviation.

Further non-limiting embodiments or aspects are set forth in the following numbered clauses:

Clause 1: A method for controlling online actions performed by a user device, comprising: receiving, with at least one processor and via a communication network, a request to perform an online action from a user device; retrieving, with at least one processor, data associated with a number of times the user device performed the online action within at least one time interval; determining, with at least one processor, whether a dataset associated with a number of times a plurality of user devices have performed the online action within the at least one time interval is normally distributed; determining, with at least one processor, a standard deviation associated with the number of times the user device performed the online action within the at least one time interval in response to determining that the dataset is normally distributed; and performing, with at least one processor, a control operation associated with the request to conduct the online action based on a threshold of standard deviation.

Clause 2: The method of clause 1, further comprising: calculating, with at least one processor, at least one value of a percentile associated with the number of times the user device performed the online action within the at least one time interval based on at least one value of the number of times the online action has been performed by the user device within the at least one time interval, wherein performing the control operation associated with the request to conduct the online action based on the threshold of standard deviation comprises: performing, with at least one processor, the control operation associated with the request to conduct the online action based on the threshold of standard deviation and the percentile associated with the number of times the user device performed the online action.

Clause 3: The method of clauses 1 or 2, wherein the online action comprises at least one of: an online action associated with a user login process; an online action associated with a forgotten password process; an online action associated with a purchase transaction; or an online action associated with an addition of user information to a user account.

Clause 4: The method of any of clauses 1-3, wherein the request comprises at least one identity attribute associated with the user device and an identification attribute associated with the online action, and wherein retrieving the data associated with the number of times the online action has been performed by the user device within the at least one time interval comprises: retrieving the data associated with the number of times the online action has been performed by the user device within the at least one time interval based on the at least one identity attribute associated with the user device and the identification attribute associated with the online action.

Clause 5: The method of any of clauses 1-4, further comprising: calculating the at least one value of the number of times the user device performed the online action within the at least one time interval; and storing the at least one value of the number of times the user device performed the online action within the at least one time interval within a data structure.

Clause 6: The method of any of clauses 1-5, wherein determining whether the dataset associated with the number of times the plurality of user devices have performed the online action within the at least one time interval is normally distributed comprises: determining whether the dataset associated with the number of times the plurality of user devices have performed the online action within the at least one time interval is normally distributed based on a selected normality check method.

Clause 7: The method of any of clauses 1-6, further comprising: calculating at least one value of a median of the number of times the user device performed the online action within the at least one time interval, wherein calculating the at least one value of the percentile associated with the number of times the user device performed the online action within the at least one time interval comprises: calculating the at least one value of the percentile associated with the number of times the user device performed the online action within the at least one time interval based on the at least one value of the median of the number of times the user device performed the online action within the at least one time interval.

Clause 8: The method of any of clauses 1-7, wherein performing the control operation associated with the request to conduct the online action comprises: performing the control operation associated with the request to conduct the online action based on determining the standard deviation is within a predetermined Gaussian range.

Clause 9: The method of any of clauses 1-8, wherein performing the control operation associated with the request to conduct the online action comprises: performing the control operation associated with the request to conduct the online action based on determining the standard deviation is within a predetermined Gaussian range for a type of online action associated with the online action.

Clause 10: A system comprising: at least one processor programmed or configured to: receive via a communication network, a request to perform an online action from a user device, wherein the request comprises at least one identity attribute associated with the user device and an identification attribute associated with the online action; retrieve data associated with a number of times the online action has been performed by the user device within at least one time interval based on the at least one identity attribute associated with the user device and the identification attribute associated with the online action; determine whether a dataset associated with a number of times a plurality of user devices have performed the online action within the at least one time interval is normally distributed; determine a standard deviation associated with the number of times the user device performed the online action within the at least one time interval in response to determining that the dataset is normally distributed; and perform a control operation associated with the request to conduct the online action based on a threshold of standard deviation.

Clause 11: The system of clause 10, wherein the at least one processor is further programmed or configured to: calculate at least one value of a percentile associated with the number of times the user device performed the online action within the at least one time interval based on at least one value of the number of times the online action has been performed by the user device within the at least one time interval, and wherein, when performing the control operation associated with the request to conduct the online action based on the threshold of standard deviation, the at least one processor is programmed or configured to: perform the control operation associated with the request to conduct the online action based on the threshold of standard deviation and the percentile associated with the number of times the user device performed the online action.

Clause 12: The system of clauses 10 or 11, wherein the at least one processor is further programmed or configured to: calculate the at least one value of the number of times the user device performed the online action within the at least one time interval; and store the at least one value of the number of times the user device performed the online action within the at least one time interval within a data structure.

Clause 13: The system of any of clauses 10-12, wherein, when determining whether the dataset associated with the number of times the plurality of user devices have performed the online action within the at least one time interval is normally distributed, the at least one processor is programmed or configured to: determine whether the dataset associated with the number of times the plurality of user devices have performed the online action within the at least one time interval is normally distributed based on a selected normality check method.

Clause 14: The system of any of clauses 10-13, wherein the at least one processor is further programmed or configured to: calculate at least one value of a median of the number of times the user device performed the online action within the at least one time interval; and wherein, when calculating the at least one value of the percentile associated with the number of times the user device performed the online action within the at least one time interval, the at least one processor is programmed or configured to: calculate the at least one value of the percentile associated with the number of times the user device performed the online action within the at least one time interval based on the at least one value of the median of the number of times the user device performed the online action within the at least one time interval.

Clause 15: The system of any of clauses 10-14, wherein, when performing the control operation associated with the request to conduct the online action, the at least one processor is programmed or configured to: perform the control operation associated with the request to conduct the online action based on determining the standard deviation is within a predetermined Gaussian range.

Clause 16: The system of any of clauses 10-15, wherein, when performing the control operation associated with the request to conduct the online action, the at least one processor is programmed or configured to: perform the control operation associated with the request to conduct the online action based on determining the standard deviation is within a predetermined Gaussian range for a type of online action associated with the online action.

Clause 17: A computer program product comprising at least one non-transitory computer-readable medium including one or more instructions that, when executed by at least one processor, cause the at least one processor to: receive via a communication network, a request to perform an online action from a user device, wherein the request comprises at least one identity attribute associated with the user device and an identification attribute associated with the online action; retrieve data associated with a number of times the online action has been performed by the user device within at least one time interval based on the at least one identity attribute associated with the user device and the identification attribute associated with the online action; determine whether a dataset associated with a number of times a plurality of user devices have performed the online action within the at least one time interval is normally distributed based on a selected normality check method; determine a standard deviation associated with the number of times the user device performed the online action within the at least one time interval in response to determining that the dataset is normally distributed; and perform a control operation associated with the request to conduct the online action based on a threshold of standard deviation.

Clause 18: The computer program product of clause 17, wherein the one or more instructions further cause the at least one processor to: calculate at least one value of a percentile associated with the number of times the user device performed the online action within the at least one time interval based on at least one value of the number of times the online action has been performed by the user device within the at least one time interval, and wherein the one or more instructions that cause the at least one processor to perform the control operation associated with the request to conduct the online action based on the threshold of standard deviation cause the at least one processor to: perform the control operation associated with the request to conduct the online action based on the threshold of standard deviation and the percentile associated with the number of times the user device performed the online action.

Clause 19: The computer program product of clauses 17 or 18, wherein the one or more instructions further cause the at least one processor to: calculate at least one value of a median of the number of times the user device performed the online action within the at least one time interval; and wherein the one or more instructions that cause the at least one processor to calculate the at least one value of the percentile associated with the number of times the user device performed the online action within the at least one time interval, cause the at least one processor to: calculate the at least one value of the percentile associated with the number of times the user device performed the online action within the at least one time interval based on the at least one value of the median of the number of times the user device performed the online action within the at least one time interval.

Clause 20: The computer program product of any of clauses 17-19, wherein the one or more instructions that cause the at least one processor to perform the control operation associated with the request to conduct the online action cause the at least one processor to: perform the control operation associated with the request to conduct the online action based on determining the standard deviation is within a predetermined Gaussian range.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the present disclosure. As used in the specification and the claims, the singular form of "a," "an," and "the" include plural referents unless the context clearly dictates otherwise.

BRIEF DESCRIPTION OF THE DRAWINGS

FIGS. 4A-4K are diagrams of an implementation of a non-limiting aspect or embodiment of a process for controlling access to online actions that may be performed by a user device.

DESCRIPTION

Figure 1:
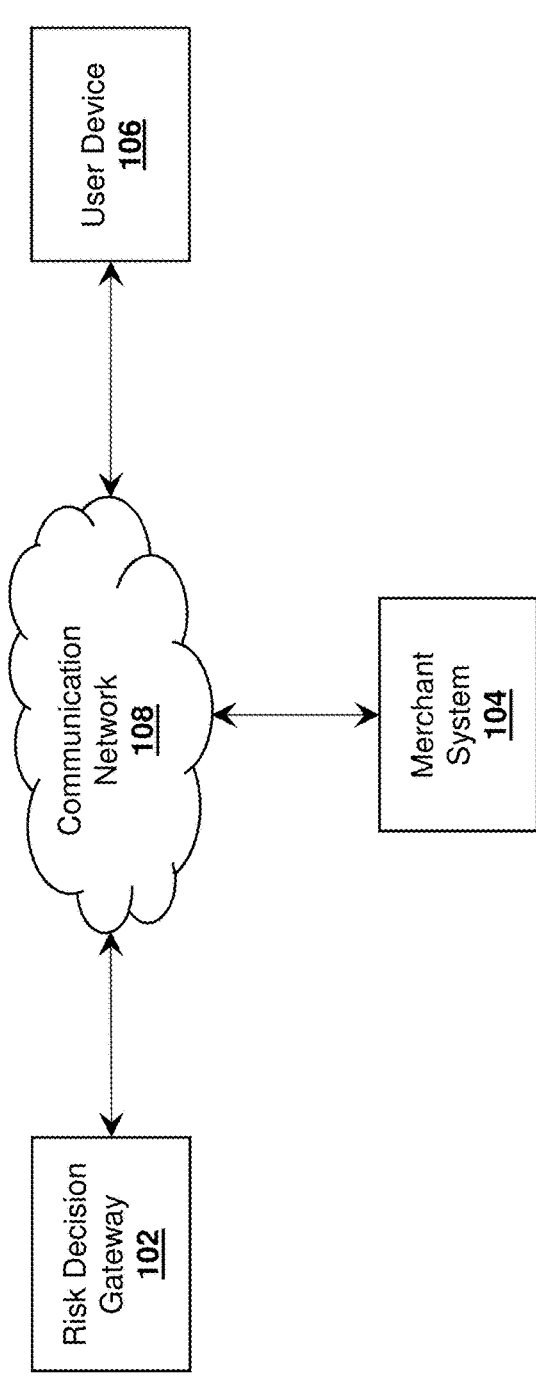
FIG. 1 is a diagram of a non-limiting aspect or embodiment of a system for controlling access to online actions that may be performed by a user device.

For purposes of the description hereinafter, the terms "end," "upper," "lower," "right," "left," "vertical," "horizontal," "top," "bottom," "lateral," "longitudinal," and derivatives thereof shall relate to the disclosure as it is oriented in the drawing figures. However, it is to be understood that the disclosure may assume various alternative variations and step sequences, except where expressly specified to the contrary. It is also to be understood that the specific devices and processes illustrated in the attached drawings, and described in the following specification, are simply exemplary embodiments or aspects of the disclosure. Hence, specific dimensions and other physical characteristics related to the embodiments or aspects of the embodiments disclosed herein are not to be considered as limiting unless otherwise indicated.

No aspect, component, element, structure, act, step, function, instruction, and/or the like used herein should be construed as critical or essential unless explicitly described as such. In addition, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some non-limiting embodiments or aspects, a message may refer to a network packet (e.g., a data packet and/or the like) that includes data.

As used herein, the terms "issuer," "issuer institution," "issuer bank," or "payment device issuer," may refer to one or more entities that provide accounts to individuals (e.g., users, customers, and/or the like) for conducting payment transactions, such as credit payment transactions and/or debit payment transactions. For example, an issuer institution may provide an account identifier, such as a primary account number (PAN), to a customer that uniquely identifies one or more accounts associated with that customer. In some non-limiting embodiments or aspects, an issuer may be associated with a bank identification number (BIN) that uniquely identifies the issuer institution. As used herein, the term "issuer system" may refer to one or more computer systems operated by or on behalf of an issuer, such as a server executing one or more software applications. For example, an issuer system may include one or more authorization servers for authorizing a transaction.

As used herein, the term "account identifier" may refer to one or more types of identifiers associated with an account (e.g., a PAN associated with an account, a card number associated with an account, a payment card number associated with an account, a token associated with an account, and/or the like). In some non-limiting embodiments or aspects, an issuer may provide an account identifier (e.g., a PAN, a token, and/or the like) to a user (e.g., an accountholder) that uniquely identifies one or more accounts associated with that user. The account identifier may be embodied on a payment device (e.g., a physical instrument used for conducting payment transactions, such as a payment card, a credit card, a debit card, a gift card, and/or the like) and/or may be electronic information communicated to the user that the user may use for electronic payment transactions. In some non-limiting embodiments or aspects, the account identifier may be an original account identifier, where the original account identifier was provided to a user at the creation of the account associated with the account identifier. In some non-limiting embodiments or aspects, the account identifier may be a supplemental account identifier, which may include an account identifier that is provided to a user after the original account identifier was provided to the user. For example, if the original account identifier is forgotten, stolen, and/or the like, a supplemental account identifier may be provided to the user. In some non-limiting embodiments or aspects, an account identifier may be directly or indirectly associated with an issuer institution such that an account identifier may be a token that maps to a PAN or other type of account identifier. Account identifiers may be alphanumeric, any combination of characters and/or symbols, and/or the like.

As used herein, the term "token" may refer to an account identifier that is used as a substitute or replacement for another account identifier, such as a PAN. Tokens may be associated with a PAN or other original account identifier in one or more data structures (e.g., one or more databases and/or the like) such that they may be used to conduct a payment transaction without directly using the original account identifier. In some non-limiting embodiments or aspects, an original account identifier, such as a PAN, may be associated with a plurality of tokens for different individuals or purposes. In some non-limiting embodiments or aspects, tokens may be associated with a PAN or other account identifiers in one or more data structures such that they can be used to conduct a transaction without directly using the PAN or the other account identifiers. In some examples, an account identifier, such as a PAN, may be associated with a plurality of tokens for different uses or different purposes.

As used herein, the term "merchant" may refer to one or more entities (e.g., operators of retail businesses) that provide goods and/or services, and/or access to goods and/or services, to a user (e.g., a customer, a consumer, and/or the like) based on a transaction, such as a payment transaction. As used herein, the term "merchant system" may refer to one or more computer systems operated by or on behalf of a merchant, such as a server executing one or more software applications. As used herein, the term "product" may refer to one or more goods and/or services offered by a merchant.

As used herein, a "point-of-sale (POS) device" may refer to one or more devices, which may be used by a merchant to conduct a transaction (e.g., a payment transaction) and/or process a transaction. For example, a POS device may include one or more client devices. Additionally or alternatively, a POS device may include peripheral devices, card readers, scanning devices (e.g., code scanners), Bluetooth® communication receivers, near-field communication (NFC) receivers, radio frequency identification (RFID) receivers, and/or other contactless transceivers or receivers, contact-based receivers, payment terminals, and/or the like.

As used herein, a "point-of-sale (POS) system" may refer to one or more client devices and/or peripheral devices used by a merchant to conduct a transaction. For example, a POS system may include one or more POS devices and/or other like devices that may be used to conduct a payment transaction. In some non-limiting embodiments or aspects, a POS system (e.g., a merchant POS system) may include one or more server computers programmed or configured to process online payment transactions through webpages, mobile applications, and/or the like.

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network such as Visa, Mastercard®, American Express®, or any other entity that processes transactions. As used herein, the term "transaction service provider system" may refer to one or more computer systems operated by or on behalf of a transaction service provider, such as a transaction service provider system executing one or more software applications. A transaction service provider system may include one or more processors and, in some non-limiting embodiments or aspects, may be operated by or on behalf of a transaction service provider.

As used herein, the term "acquirer" may refer to an entity licensed by the transaction service provider and approved by the transaction service provider to originate transactions (e.g., payment transactions) involving a payment device associated with the transaction service provider. As used herein, the term "acquirer system" may also refer to one or more computer systems, computer devices, and/or the like operated by or on behalf of an acquirer. The transactions the acquirer may originate may include payment transactions (e.g., purchases, original credit transactions (OCTs), account funding transactions (AFTs), and/or the like). In some non-limiting embodiments or aspects, the acquirer may be authorized by the transaction service provider to assign merchant or service providers to originate transactions involving a payment device associated with the transaction service provider. The acquirer may contract with payment facilitators to enable the payment facilitators to sponsor merchants. The acquirer may monitor compliance of the payment facilitators in accordance with regulations of the transaction service provider. The acquirer may conduct due diligence of the payment facilitators and ensure proper due diligence occurs before signing a sponsored merchant. The acquirer may be liable for all transaction service provider programs that the acquirer operates or sponsors. The acquirer may be responsible for the acts of the acquirer's payment facilitators, merchants that are sponsored by the acquirer's payment facilitators, and/or the like. In some non-limiting embodiments or aspects, an acquirer may be a financial institution, such as a bank.

As used herein, the term "payment device" may refer to a payment card (e.g., a credit or debit card), a gift card, a smartcard, smart media, a payroll card, a healthcare card, a wristband, a machine-readable medium containing account information, a keychain device or fob, an RFID transponder, a retailer discount or loyalty card, and/or the like. The payment device may include a volatile or a non-volatile memory to store information (e.g., an account identifier, a name of the account holder, and/or the like).

As used herein, the terms "client" and "client device" may refer to one or more computing devices, such as processors, storage devices, and/or similar computer components, that access a service made available by a server. In some non-limiting embodiments or aspects, a "client device" may refer to one or more devices that facilitate payment transactions, such as POS devices and/or POS systems used by a merchant. In some non-limiting embodiments or aspects, a client device may include an electronic device configured to communicate with one or more networks and/or facilitate payment transactions such as, but not limited to, one or more desktop computers, one or more portable computers (e.g., tablet computers), one or more mobile devices (e.g., cellular phones, smartphones, PDAs, wearable devices, such as watches, glasses, lenses, and/or clothing, and/or the like), and/or other like devices. Moreover, a "client" may also refer to an entity, such as a merchant, that owns, utilizes, and/or operates a client device for facilitating payment transactions with a transaction service provider.

As used herein, the term "server" may refer to one or more computing devices, such as processors, storage devices, and/or similar computer components that communicate with client devices and/or other computing devices over a network, such as the Internet or private networks and, in some examples, facilitate communication among other servers and/or client devices.

As used herein, the term "system" may refer to one or more computing devices or combinations of computing devices such as, but not limited to, processors, servers, client devices, software applications, and/or other like components. In addition, reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

Provided are improved systems, methods, and computer program products for controlling access to online actions that may be performed by a user device. In some non-limiting embodiments or aspects, systems, methods, and computer program products may include receiving, via a communication network, a request to perform an online action from a user device, retrieving data associated with a number of times the user device performed the online action within at least one time interval, determining whether a dataset associated with a number of times a plurality of user devices have performed the online action within the at least one time interval is normally distributed, determining a standard deviation associated with the number of times the user device performed the online action within the at least one time interval in response to determining that the dataset is normally distributed, and performing a control operation associated with the request to conduct the online action based on a threshold of standard deviation.

By virtue of the implementation of systems, methods, and computer program products described herein, a server that receives a request to perform an online action may more accurately determine whether to perform or forego performing a control operation based on the request to perform the online action. For example, when the number of times that the user may be able to attempt to access the online account is determined based on a standard deviation associated with a number of times the user device performed the online action, the server may forgo inappropriately locking out the user from the account when the number of times the user device performed the online action exceeds the static value but does not exceed the standard deviation. In this way, the user may forgo expending a large amount of time trying to gain access to the online account when the user is inappropriately locked out of the online account. In addition, network resources may be conserved between a user device associated with the user and the server that hosts the online account when the user attempting to access the online account is able to gain access to the online account.

Referring now to FIG. 1, FIG. 1 is a diagram of an example environment 100 in which devices, systems, methods, and/or products described herein may be implemented. As shown in FIG. 1, environment 100 includes user device 106, merchant system 104, risk decision gateway 102 and communication network 108. User device 106, merchant system 104, risk decision gateway 102 and/or communication network 108 may interconnect (e.g., establish a connection to communicate, and/or the like) via wired connections, wireless connections, or a combination of wired and wireless connections.

User device 106 may include one or more devices configured to be in communication with merchant system 104 and/or risk decision gateway 102 via communication network 108. For example, user device 106 may include a smartphone, a tablet, a laptop computer, a desktop computer, and/or the like. User device 106 may be configured to transmit and/or receive data to and/or from merchant system 104 via an imaging system and/or a short-range wireless communication connection (e.g., an NFC communication connection, an RFID communication connection, a Bluetooth® communication connection, and/or the like). In some non-limiting embodiments or aspects, user device 106 may be associated with a user (e.g., an individual operating a device).

Merchant system 104 may include one or more devices configured to be in communication with user device 106 and/or risk decision gateway 102 via communication network 108. For example, merchant system 104 may include one or more servers, one or more groups of servers, one or more client devices, one or more groups of client devices, and/or the like. In some non-limiting embodiments or aspects, merchant system 104 may include a point-of-sale (POS) device. In some non-limiting embodiments or aspects, merchant system 104 may be associated with a merchant as described herein.

Risk decision gateway 102 may include one or more devices configured to be in communication with user device 106 and/or merchant system 104 via communication network 108. For example, risk decision gateway 102 may include one or more servers, one or more groups of servers, and/or the like. In some non-limiting embodiments or aspects, risk decision gateway 102 may be associated with a payment gateway and/or a transaction service provider as described herein. Additionally or alternatively, risk decision gateway 102 may be associated with an issuer institution and/or an acquirer institution as described herein.

Communication network 108 may include one or more wired and/or wireless networks. For example, communication network 108 may include a cellular network (e.g., a long-term evolution (LTE) network, a third generation (3G) network, a fourth generation (4G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN)), a private network, an ad hoc network, an intranet, the Internet, a fiber optic-based network, a cloud computing network, and/or the like, and/or a combination of some or all of these or other types of networks.

The number and arrangement of systems and/or devices shown in FIG. 1 are provided as an example. There may be additional systems and/or devices, fewer systems and/or devices, different systems and/or devices, or differently arranged systems and/or devices than those shown in FIG. 1. Furthermore, two or more systems and/or devices shown in FIG. 1 may be implemented within a single system or a single device, or a single system or a single device shown in FIG. 1 may be implemented as multiple, distributed systems or devices. Additionally or alternatively, a set of systems or a set of devices (e.g., one or more systems, one or more devices) of environment 100 may perform one or more functions described as being performed by another set of systems or another set of devices of environment 100.

Figure 2:
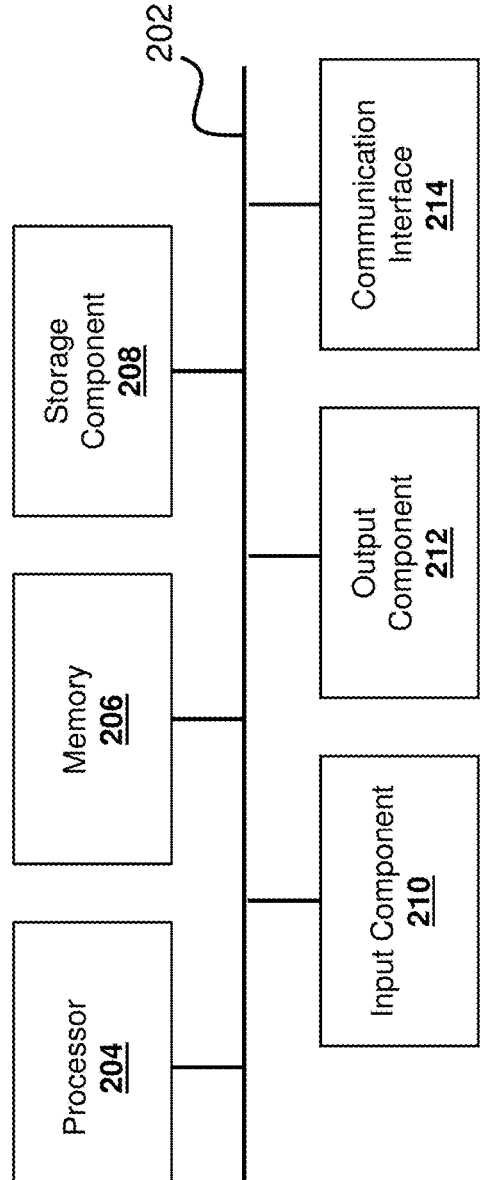
FIG. 2 is a diagram of a non-limiting aspect or embodiment of components of one or more devices and/or one or more systems of FIG. 1.

Referring now to FIG. 2, FIG. 2 is a diagram of example components of device 200. Device 200 may correspond to one or more devices of user device 106 (e.g., one or more devices of a system of user device 106), one or more devices of merchant system 104 (e.g., one or more devices of a system of merchant system 104), and/or one or more devices of risk decision gateway 102 (e.g., one or more devices of a system of risk decision gateway 102), and/or one or more devices of communication network 108 (e.g., one or more devices of a system of communication network 108). In some non-limiting embodiments or aspects, one or more devices of user device 106, one or more devices of merchant system 104, one or more devices of risk decision gateway 102, and/or one or more devices of the communication network 108 may include at least one device 200 and/or at least one component of device 200. As shown in FIG. 2, device 200 may include bus 202, processor 204, memory 206, storage component 208, input component 210, output component 212, and communication interface 214.

Bus 202 may include a component that permits communication among the components of device 200. In some non-limiting embodiments or aspects, processor 204 may be implemented in hardware, software, or a combination of hardware and software. For example, processor 204 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 206 may include random access memory (RAM), read-only memory (ROM), and/or another type of dynamic or static storage device (e.g., flash memory, magnetic memory, optical memory, etc.) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touchscreen display, a keyboard, a keypad, a mouse, a button, a switch, a microphone, a camera, etc.). Additionally or alternatively, input component 210 may include a sensor for sensing information (e.g., a global positioning system (GPS) component, an accelerometer, a gyroscope, an actuator, etc.). Output component 212 may include a component that provides output information from device 200 (e.g., a display, a speaker, one or more light-emitting diodes (LEDs), etc.).

Communication interface 214 may include a transceiver-like component (e.g., a transceiver, a separate receiver and transmitter, etc.) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A non-transitory memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally or alternatively, hardwired circuitry may be used in place of or in combination with software instructions to perform one or more processes described herein. Thus, embodiments or aspects described herein are not limited to any specific combination of hardware circuitry and software.

Memory 206 and/or storage component 208 may include data storage or one or more data structures (e.g., a database, and/or the like). Device 200 may be capable of receiving information from, storing information in, communicating information to, or searching information stored in the data storage or one or more data structures in memory 206 and/or storage component 208. For example, the information may include input data, output data, transaction data, account data, or any combination thereof.

The number and arrangement of components shown in FIG. 2 are provided as an example. In some non-limiting embodiments or aspects, device 200 may include additional components, fewer components, different components, or differently arranged components than those shown in FIG. 2. Additionally or alternatively, a set of components (e.g., one or more components) of device 200 may perform one or more functions described as being performed by another set of components of device 200.

Figure 3:
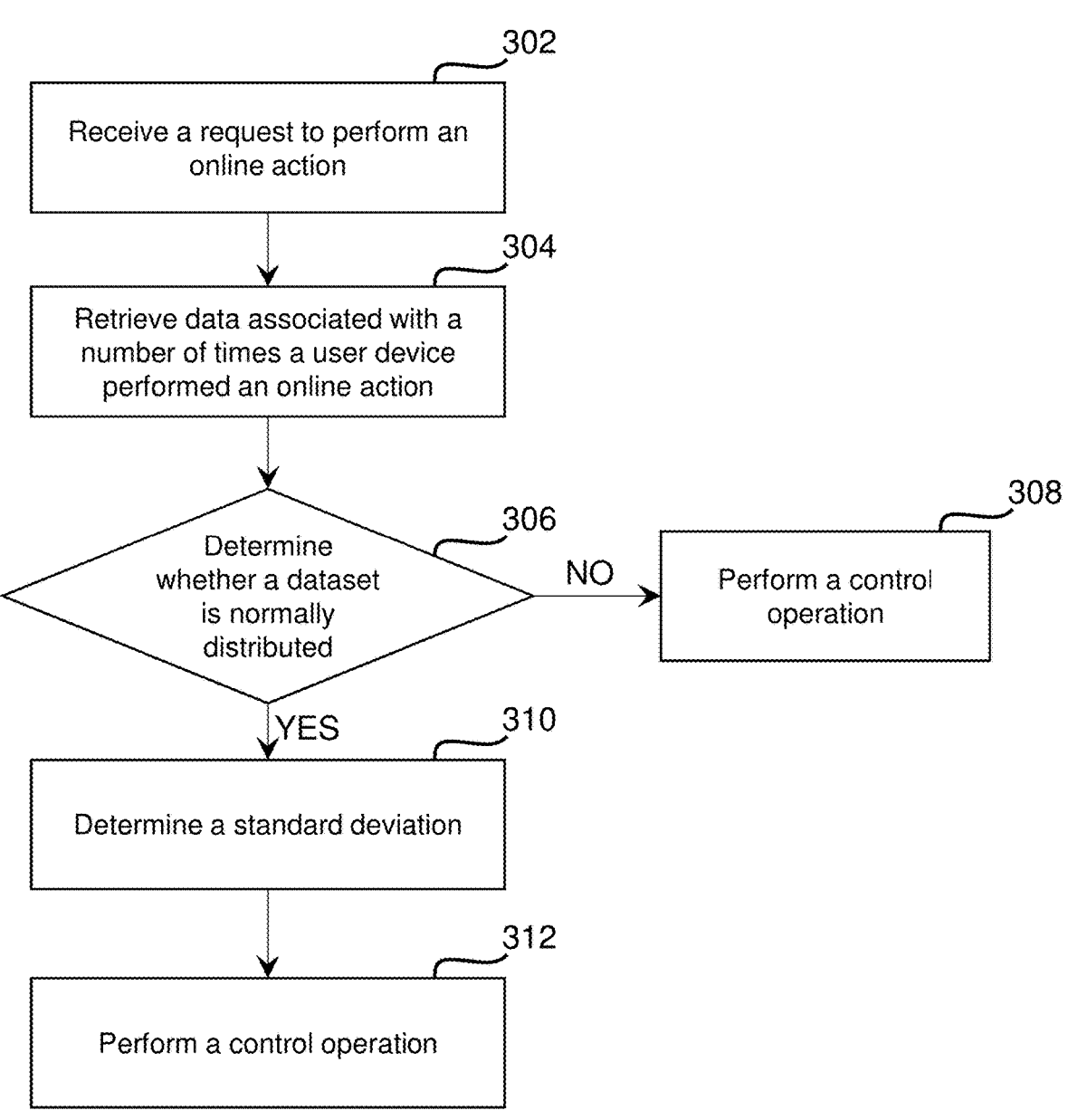
FIG. 3 is a flowchart of a non-limiting aspect or embodiment of a process for controlling access to online actions that may be performed by a user device.

Referring now to FIG. 3, FIG. 3 is a flowchart of a non-limiting aspect or embodiment of a process 300 for controlling access to online actions that may be performed by a user device. In some non-limiting embodiments or aspects, one or more of the functions described with respect to process 300 may be performed (e.g., completely, partially, etc.) by risk decision gateway 102. In some non-limiting embodiments or aspects, one or more of the steps of process 300 may be performed (e.g., completely, partially, and/or the like) by another device or a group of devices separate from and/or including risk decision gateway 102, such as, for example, user device 106, merchant system 104, and/or communication network 108.

As shown in FIG. 3, at step 302, process 300 may include receiving a request to perform an online action. For example, risk decision gateway 102 may receive a request to perform an online action. In some non-limiting embodiments or aspects, risk decision gateway 102 may receive a request to perform an online action from user device 106. For example, risk decision gateway 102 may receive a request to perform an online action from user device 106 based on user device 106 receiving input at user device 106. In such an example, the input may be associated with the request to perform the online action (e.g., the input may be configured to cause user device 106 to generate and/or transmit the request to perform the online action). In some non-limiting embodiments or aspects, the request to perform the online action may specify, for example, an online action associated with a user login process (e.g., logging into an account), an online action associated with a forgotten password process (e.g., resetting and/or retrieving a password associated with an account), an online action associated with a purchase transaction (e.g., an online purchase of goods and/or services), an online action associated with an addition of user information to a user account, and/or the like. In some non-limiting embodiments or aspects, risk decision gateway 102 may receive the request to perform the online action via communication network 108. For example, risk decision gateway 102 may receive the request to perform the online action via communication network 108 from user device 106. Additionally or alternatively, risk decision gateway 102 may receive a request to perform the online action via communication network 108 from another user device different from user device 106.

In some non-limiting embodiments or aspects, user device 106 may generate the request to perform the online action. For example, user device 106 may generate the request to perform the online action based on input received by user device 106. In such an example, the input received by user device 106 may cause user device 106 to determine data associated with at least one identity attribute and/or data associated with at least one identification attribute. In some non-limiting embodiments or aspects, user device 106 may include the data associated with at least one identity attribute and/or the data associated with at least one identification attribute in the request to perform the online action. In some non-limiting embodiments or aspects, an identity attribute may be associated with (e.g., may identify, may specify, and/or the like) an electronic mail (email) identifier, a device identifier, a unique device identifier, an internet protocol (IP) address associated with user device 106, latitude and/or longitude coordinates for user device 106, a payment account number (e.g., a credit card number), a telephone number, and/or the like. In some non-limiting embodiments or aspects, an identification attribute may be associated with (e.g., may identify, may specify, and/or the like) the online action. For example, an identification attribute may identify the online action as being associated with a user login process (e.g., to an account accessible via communication network 108), a forgot password process (e.g., a request to retrieve and/or reset a password, and/or the like), a payment account addition process (e.g., a request to add and/or associate an online account of the user associated with user device 106 with a payment account), and/or the like.

In some non-limiting embodiments or aspects, risk decision gateway 102 may store data associated with the request to perform the online action in a data structure. For example, risk decision gateway 102 may store data associated with the request to perform the online action in a data structure based on risk decision gateway 102 receiving the request to perform the online action. In such an example, risk decision gateway 102 may store the data associated with the request to perform the online action in the data structure based on risk decision gateway 102 receiving the request to perform the online action from user device 106 and/or at least one different user device. Requests to perform the online action stored in the data structure may include the data associated with at least one identity attribute, the data associated with at least one identification attribute, and/or the like.

In some non-limiting embodiments or aspects, risk decision gateway 102 may generate a request identifier for the request to perform the online action. For example, risk decision gateway 102 may generate a request identifier for the request to perform the online action based on risk decision gateway 102 receiving the request to perform the online action from user device 106 and/or at least one different user device. In some non-limiting embodiments or aspects, risk decision gateway 102 may store the data associated with the request to perform the online action in the data structure in association with the request identifier. In some non-limiting embodiments or aspects, risk decision gateway 102 may store the data associated with the request to perform the online action in a dataset included in the data structure. In some non-limiting embodiments or aspects, a dataset included in the data structure may include data associated with at least one request to perform the online action that was received from user device 106, data associated with at least one request to perform the online action that was received from a plurality of user devices that may include user device 106, and/or the like.

As shown in FIG. 3, at step 304, process 300 may include retrieving data associated with a number of times a user device performed an online action. For example, risk decision gateway 102 may retrieve data associated with a number of times user device 106 performed an online action. In some non-limiting embodiments or aspects, risk decision gateway 102 may retrieve data associated with a number of times user device 106 performed an online action within a time interval (e.g., a minute such as the last minute, an hour such as the last hour, a day such as the last day, a week such as the last week, and/or the like). Additionally or alternatively, risk decision gateway 102 may retrieve data associated with a number of times user device 106 performed an online action within a plurality of time intervals. In some non-limiting embodiments or aspects, risk decision gateway 102 may retrieve data associated with a number of times user device 106 performed an online action within a time interval based on risk decision gateway 102 receiving a request to perform an online action. For example, risk decision gateway 102 may retrieve data associated with a number of times user device 106 performed an online action within a time interval based on risk decision gateway 102 receiving a request to perform an online action from user device 106.

In some non-limiting embodiments or aspects, risk decision gateway 102 may retrieve data associated with a number of times an online action has been performed based on at least one identity attribute. For example, risk decision gateway 102 may retrieve data associated with a number of times an online action has been performed based on at least one identity attribute associated with user device 106. In such an example, data associated with the at least one identity attribute may be included in the request to perform the online action. Additionally or alternatively, risk decision gateway 102 may retrieve data associated with a number of times an online action has been performed based on an identification attribute. For example, risk decision gateway 102 may retrieve data associated with a number of times an online action has been performed based on data associated with an identification attribute included in a request to perform an online action. In some non-limiting embodiments or aspects, data associated with a number of times an online action has been performed may include data associated with a number of times a plurality of user devices have performed an online action. Additionally or alternatively, the data associated with the number of times the online action has been performed may include data associated with a number of times user device 106 performed the online action.

In some non-limiting embodiments or aspects, risk decision gateway 102 may retrieve data associated with a number of times user device 106 performed an online action within a time interval. For example, risk decision gateway 102 may retrieve data associated with a number of times user device 106 performed an online action within a time interval from a data structure, the data structure including at least one dataset as described herein. In such an example, the at least one dataset may include data associated with at least one request to perform an online action that was transmitted by user device 106. Additionally or alternatively, the data structure may include at least one dataset where the dataset includes data associated with at least one request to perform an online action that was transmitted by at least one user device that may or may not include user device 106.

In some non-limiting embodiments or aspects, risk decision gateway 102 may retrieve data associated with a number of times an online action has been performed based on a query. For example, risk decision gateway 102 may retrieve data associated with a number of times an online action has been performed based on a query generated by risk decision gateway 102. In such an example, risk decision gateway 102 may generate the query based on (e.g., to include) data associated with at least one identification attribute and/or data associated with at least one identity attribute. In some non-limiting embodiments or aspects, the data associated with the at least one identification attribute and/or the data associated with the at least one identity attribute included in the query may be the same as or similar to the data associated with the at least one identification attribute and/or the data associated with the at least one identity attribute included in the request to perform the online action received from user device 106. In some non-limiting embodiments or aspects, the query may include data associated with (e.g., specifying) at least one time interval. For example, the query may include data associated with at least one time interval during which the online action may have been performed by user device 106.

In some non-limiting embodiments or aspects, risk decision gateway 102 may receive data associated with a number of times the online action was performed from a data structure based on risk decision gateway 102 comparing data included in a query to data included in a data structure. For example, risk decision gateway 102 may receive data associated with a number of times the online action was performed from a data structure based on risk decision gateway 102 comparing the data included in a query to the data included in a data structure (e.g., data included in at least one request to perform an online action that is stored in the data structure). Where data included in the query matches data included in at least one request to perform an online action that is stored in the data structure, risk decision gateway 102 may retrieve the data included in the at least one request to perform the online action from the data structure. Additionally or alternatively, where data included in the query does not match data included in at least one request to perform an online action that is stored in the data structure, risk decision gateway 102 may forgo retrieving the data included in the at least one request to perform the online action from the data structure.

In some non-limiting embodiments or aspects, risk decision gateway 102 may calculate a value of a number of times user device 106 performed an online action. For example, risk decision gateway 102 may calculate a value of a number of times user device 106 performed an online action based on data associated with the number of times the online action has been performed by user device 106 that was retrieved by risk decision gateway 102 from a data structure as described herein. In such an example, the data associated with the number of times the online action has been performed may include at least one request to perform the online action and at least one corresponding request identifier. In some non-limiting embodiments or aspects, risk decision gateway 102 may calculate the value of the number of times user device 106 performed the online action based on the at least one request identifier (e.g., based on the amount of request identifiers included in the at least one request identifier). In some non-limiting embodiments or aspects, risk decision gateway 102 may calculate the value of a number of times user device 106 performed an online action based on the at least one request to perform the online action that was retrieved from the data structure, the at least one request having been received by risk decision gateway 102 during at least one time interval. Additionally or alternatively, risk decision gateway 102 may calculate at least one value associated with a number of times user device 106 performed an online action based on the at least one request to perform the online action that was retrieved from the data structure during a plurality of time intervals, where each value of the at least one value is associated with the number of times user device 106 performed the online action during a respective time interval of the plurality of time intervals. In some non-limiting embodiments or aspects, risk decision gateway 102 may store the at least one value of the number of times user device 106 performed the online action within a data structure.

In some non-limiting embodiments or aspects, risk decision gateway 102 may calculate at least one value of a median of the number of times user device 106 performed the online action. For example, risk decision gateway 102 may calculate at least one value of a median of the number of times user device 106 performed the online action based on the data associated with the number of times user device 106 performed the online action. Additionally or alternatively, risk decision gateway 102 may calculate at least one value of a median of the number of times user device 106 performed the online action based on data associated with a number of times a plurality of user devices have performed an online action. In some non-limiting embodiments or aspects, risk decision gateway 102 may calculate the at least one value of the median of a number of times user device 106 performed the online action for at least one time interval. For example, risk decision gateway 102 may calculate a plurality of values of the median of a number of times user device 106 performed the online action for a plurality of intervals, each interval associated with a period of time (e.g., the last day, the second to last day, the third to last day, and/or the like).

In some non-limiting embodiments or aspects, risk decision gateway 102 may calculate at least one value of a percentile associated with a number of times user device 106 performed an online action. For example, risk decision gateway 102 may calculate at least one value of a percentile associated with a number of times user device 106 performed an online action within at least one time interval. In such an example, risk decision gateway 102 may calculate the at least one value of the percentile associated with the number of times user device 106 performed an online action within the at least one time interval based on at least one value of a median of the number of times user device 106 performed the online action. In some non-limiting embodiments or aspects, risk decision gateway 102 may calculate the at least one value of the percentile based on the at least one value of the median of the number of times user device 106 performed the online action and at least one value of a median of a number of times at least one user device different from and/or including user device 106 performed the online action. For example, risk decision gateway 102 may calculate the at least one value of the percentile based on risk decision gateway 102 comparing the at least one value of the median of the number of times user device 106 performed the online action and the at least one value of the median of a number of times at least one user device different from and/or including user device 106 performed the online action. In some non-limiting embodiments or aspects, risk decision gateway 102 may calculate the at least one value of the percentile based on the number of times user device 106 performed the online action and the at least one value of the median of a number of times at least one user device different from and/or including user device 106 performed the online action. For example, risk decision gateway 102 may calculate the at least one value of the percentile based on risk decision gateway 102 comparing the number of times user device 106 performed the online action and the at least one value of the number of times at least one user device different from and/or including user device 106 performed the online action.

As shown in FIG. 3, at step 306, process 300 may include determining whether a dataset is normally distributed. For example, risk decision gateway 102 may determine whether a dataset is normally distributed. In some non-limiting embodiments or aspects, the dataset may include data associated with a number of times a plurality of user devices have performed the online action. For example, the dataset may include data associated with a number of times a plurality of user devices have performed the online action within at least one time interval. In such an example, the data associated with the number of times the plurality of user devices have performed the online action within the at least one time interval may include the data associated with the number of times user device 106 performed the online action. In some non-limiting embodiments or aspects, risk decision gateway 102 may determine whether a dataset is normally distributed based on a selected normality check method (e.g., a chi-squared test).

As shown in FIG. 3, at step 308 ("NO" at step 306), process 300 may include performing a control operation. For example, risk decision gateway 102 may perform a control operation based on a percentile associated with the number of times user device 106 performed the online action. The percentile may represent a number of times user device 106 performed the online action (e.g., performed the online action during at least one time interval) as compared to a number of times a plurality of user devices performed the online action (e.g., performed the online action during the at least one time interval). In some non-limiting embodiments or aspects, risk decision gateway 102 may determine the percentile associated with the number of times user device 106 performed the online action. For example, risk decision gateway 102 may determine the percentile associated with the number of times user device 106 performed the online action based on risk decision gateway 102 determining the number of times user device 106 performed the online action. In such an example, risk decision gateway 102 may compare the number of times user device 106 performed the online action to a number of times the plurality of user devices performed the online action to determine the percentile associated with the number of times user device 106 performed the online action.

In some non-limiting embodiments or aspects, risk decision gateway 102 may determine whether the percentile satisfies a percentile threshold. For example, if risk decision gateway 102 determines that the percentile satisfies the percentile threshold, risk decision gateway 102 may perform a control operation associated with (e.g., corresponding to) the percentile threshold. If risk decision gateway 102 determines that the percentile does not satisfy the percentile threshold, risk decision gateway 102 may forgo performing the control operation associated with (e.g., corresponding to) the percentile threshold. In some non-limiting embodiments or aspects, risk decision gateway 102 may perform a control operation based on a plurality of percentile thresholds. For example, each percentile threshold of the plurality of percentile thresholds may be a range of percentiles. In such an example, a first percentile may include a first range of percentiles, a second percentile may include a second range of percentiles that are less than the first range of percentiles, a third percentile may include a third range of percentiles that are less than the first range of percentiles and the second range of percentiles, and so on.

In some non-limiting embodiments, risk decision gateway 102 may perform a control operation based on a first percentile and a second percentile. Each of the first percentile and the second percentile may be associated with a control operation. For example, if risk decision gateway 102 determines that the first percentile is satisfied, risk decision gateway 102 may perform a first control operation. If risk decision gateway 102 determines that the second percentile is satisfied, risk decision gateway 102 may perform a second control operation. In some non-limiting embodiments, the first control operation and the second control operation are different. In some non-limiting embodiments, performing the first control operation may include performing the second control operation or performing the second control operation may include performing the first control operation.

As shown in FIG. 3, at step 310 ("YES" at step 306), process 300 may include determining a standard deviation. For example, risk decision gateway 102 may determine a standard deviation. In some non-limiting embodiments or aspects, risk decision gateway 102 may determine a standard deviation associated with a number of times user device 106 performed an online action. For example, risk decision gateway 102 may determine a standard deviation associated with a number of times user device 106 performed an online action within at least one time interval. In some non-limiting embodiments or aspects, risk decision gateway 102 may determine a standard deviation associated with a number of times user device 106 performed an online action based on (e.g., in response to) risk decision gateway 102 determining that a dataset is normally distributed. For example, risk decision gateway 102 may determine a standard deviation associated with a number of times user device 106 performed an online action based on risk decision gateway 102 determining that a dataset is normally distributed, the dataset including data associated with the number of times user device 106 performed the online action. Additionally or alternatively, risk decision gateway 102 may determine a standard deviation associated with a number of times user device 106 performed an online action based on risk decision gateway 102 determining that a dataset is normally distributed, the dataset including data associated with a number of times a plurality of user devices have performed the online action. In some non-limiting embodiments or aspects, risk decision gateway 102 may determine a standard deviation associated with a number of times user device 106 performed an online action based on at least one request to perform an online action. For example, risk decision gateway 102 may determine a standard deviation associated with a number of times user device 106 performed an online action based on at least one request to perform an online action, where the at least one request to perform the online action involves at least one user device. In such an example, the at least one user device may or may not include user device 106.

As shown in FIG. 3, at step 312, process 300 may include performing a control operation. For example, risk decision gateway 102 may perform a control operation. In some non-limiting embodiments or aspects, risk decision gateway 102 may perform a control operation based on a request to perform an online action. For example, risk decision gateway 102 may perform a control operation associated with a request to perform an online action received from user device 106. In some non-limiting embodiments or aspects, a control operation may include, for example, permitting user device 106 to perform the online action. Additionally or alternatively, a control operation may include, for example, generating a challenge (e.g., a challenge associated with a two-factor authentication protocol and/or the like). For example, risk decision gateway 102 may generate a challenge and transmit the challenge to user device 106 to cause user device 106 to request input to verify the identity of the user operating user device 106. In such an example, user device 106 may transmit the input to risk decision gateway 102 and risk decision gateway 102 may determine a second control operation (e.g., permitting user device 106 to perform the online action, forgoing permitting user device 106 to perform the online action, blacklisting user device 106 from performing the online action, and/or the like). In some non-limiting embodiments or aspects, a control operation may include, for example, forgoing permitting user device 106 to perform the online action. Additionally or alternatively, a control operation may include forgoing permitting user device 106 to perform the online action at a point in time in the future (e.g., forgoing permitting user device 106 to perform the online action based on risk decision gateway 102 receiving a request to perform an online action at a point in time later than when risk decision gateway 102 received the request to perform the online action).

In some non-limiting embodiments or aspects, risk decision gateway 102 may perform a control operation based on a threshold of standard deviation. For example, risk decision gateway 102 may determine a number of times user device 106 performed an online action (e.g., performed an online action during a time interval) and risk decision gateway 102 may compare the number of times user device 106 performed the online action to the threshold of standard deviation. If risk decision gateway 102 determines that the number of times the user device 106 performed the online action satisfies the threshold of standard deviation, risk decision gateway 102 may perform the control operation. If risk decision gateway 102 determines that the number of times the user device 106 performed the online action does not satisfy the threshold of standard deviation, risk decision gateway 102 may forgo performing the control operation. In some non-limiting embodiments, the threshold of standard deviation may include a value of standard deviation, where standard deviation is a measure of an amount of variation (e.g., dispersion) of a number of times that a plurality of user devices (e.g., a plurality of user devices that includes user device 106) each performed the online action during a time interval.

In some non-limiting embodiments or aspects, risk decision gateway 102 may perform a control operation based on a plurality of thresholds of standard deviation. In some non-limiting embodiments, each threshold of standard deviation of the plurality of thresholds of standard deviation may be a range of values of standard deviation. For example, a first threshold of standard deviation may include a first range of values of standard deviation, a second threshold of standard deviation may include a second range of values of standard deviation that are greater than the first range of values of standard deviation, a third threshold of standard deviation may include a third range of values of standard deviation that are greater than the first range of values of standard deviation and the second range of values of standard deviation, and so on.

In some non-limiting embodiments, risk decision gateway 102 may perform a control operation based on a first threshold of standard deviation and a second threshold of standard deviation. Each of the first threshold of standard deviation and the second threshold of standard deviation may be associated with a control operation. For example, if risk decision gateway 102 determines that the first threshold of standard deviation is satisfied, risk decision gateway 102 may perform a first control operation. If risk decision gateway 102 determines that the second threshold of standard deviation is satisfied, risk decision gateway 102 may perform a second control operation. In some non-limiting embodiments, the first control operation and the second control operation are different. In some non-limiting embodiments, performing the first control operation may include performing the second control operation or performing the second control operation may include performing the first control operation.

Referring now to FIGS. 4A-4K, FIGS. 4A-4K are flowcharts of a non-limiting embodiment or aspect of an implementation 400 relating to a process for controlling access to online actions that may be performed by a user device. As illustrated in FIGS. 4A-4K, implementation 400 may include user device 406 and/or risk decision gateway 402. In some non-limiting embodiments or aspects, user device 406 may be the same as, or similar to, user device 106. In some non-limiting embodiments or aspects, risk decision gateway 402 may be the same as, or similar to, risk decision gateway 102.

Figure 4A:
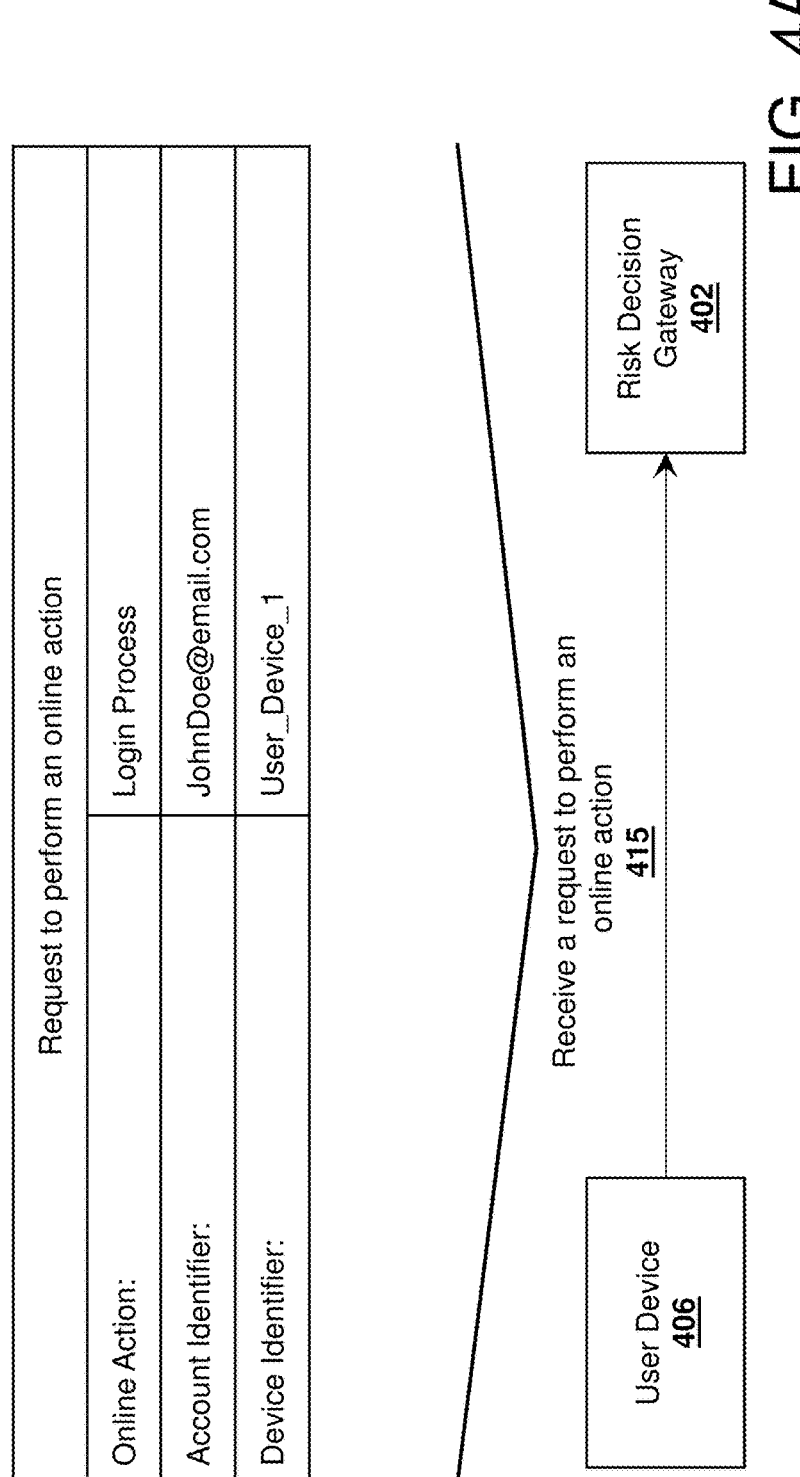

As shown by reference number 415 in FIG. 4A, risk decision gateway 402 may receive a request to perform an online action. For example, risk decision gateway 402 may receive a request to perform a login process from user device 406. In some non-limiting embodiments or aspects, the request to perform the login process may include data associated with an identification attribute specifying a type of online action, data associated with an identity attribute of an account upon which the online action is to be performed, and/or data associated with an identity attribute of user device 406. In some non-limiting embodiments or aspects, the data associated with the type of online action may include an identifier of a login process. In some non-limiting embodiments or aspects, the data associated with the identity attribute of the account may include an email account identifier (e.g., an email address), a financial account identifier (e.g., a credit card number), and/or the like. In some non-limiting embodiments or aspects, the data associated with the identity attribute of user device 406 may include a device identifier (e.g., an internet protocol (IP) address of user device 406, a latitude and/or longitude coordinate of user device 406, a phone number of user device 406, and/or the like).

As shown by reference number 420 in FIG. 4B, risk decision gateway 402 may generate a request identifier. For example, risk decision gateway 402 may generate a request identifier for the request to perform the online action received from user device 406. In such an example, risk decision gateway 402 may generate the request identifier for the request to perform the online action based on receiving the request to perform the online action from user device 406. In some non-limiting embodiments or aspects, risk decision gateway 402 may append the request identifier to the request to perform the online action.

Figure 4C:
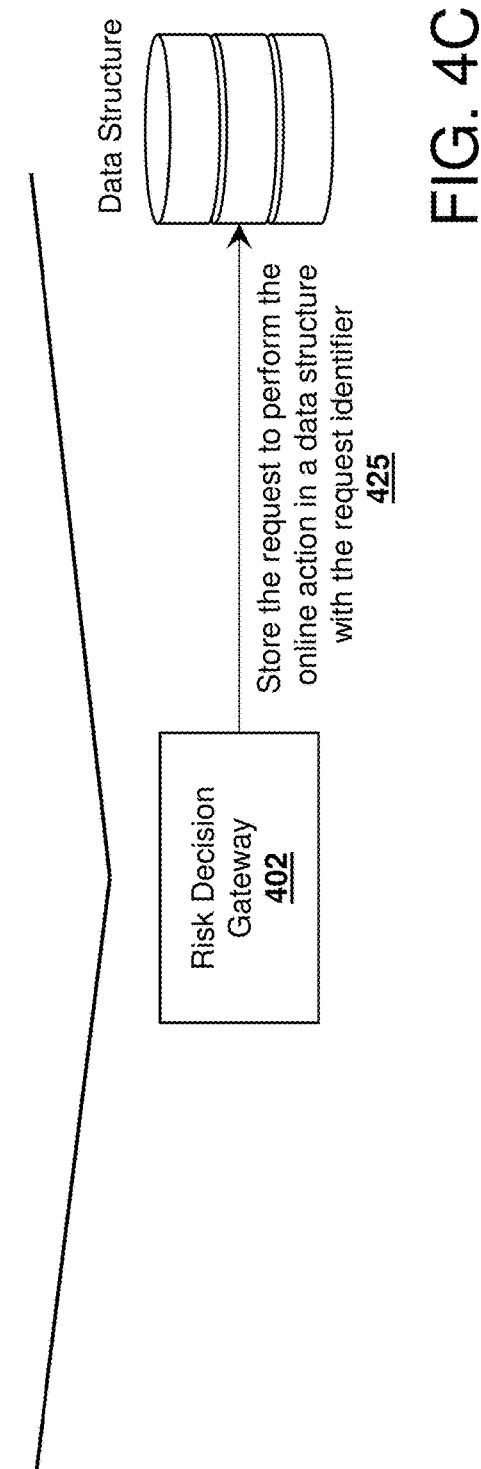

As shown by reference number 425 in FIG. 4C, risk decision gateway 402 may store the request to perform the online action in a data structure with the request identifier. For example, risk decision gateway 402 may store the request to perform the online action in a data structure with the request identifier based on risk decision gateway 402 generating the request identifier. In some non-limiting embodiments or aspects, the data structure may include a plurality of requests to perform online actions. For example, the data structure may include a plurality of requests to perform online actions, the plurality of requests received from a plurality of user devices. In such an example, the plurality of requests may include the request to perform the online action received from user device 406.

Figure 4D:

As shown by reference number 430 in FIG. 4D, risk decision gateway 402 may retrieve data associated with a number of times the online action was performed. For example, risk decision gateway 402 may retrieve data associated with a number of times the online action was performed from the data structure based on risk decision gateway 402 generating a query. In such an example, the query may include data such as, without limitation, data associated with at least one identification attribute, data associated with at least one identity attribute of the account upon which the online action is to be performed, data associated with at least one identity attribute of user device 406, and/or the like. In such an example, the data included in the query may be the same as or similar to the data included in the request to perform the online action received from user device 406. In some non-limiting embodiments or aspects, the query may be associated with (e.g., specify) at least one time interval. For example, the query may be associated with at least one time interval during which the online action may have been performed by user device 406.

As shown by reference number 435 in FIG. 4E, risk decision gateway 402 may receive the data associated with a number of times the online action was performed. For example, risk decision gateway 402 may receive data associated with a number of times the online action was performed based on risk decision gateway 402 comparing data included in the query to data included in at least one request to perform online actions that are stored in the data structure. Where data included in the query matches data included in at least one request to perform an online action that is stored in the data structure, risk decision gateway 402 may retrieve the at least one request to perform the online action from the data structure. For example, where data associated with an identity attribute included in the query (e.g., an email address) matches data associated with an identity attribute included in a request to perform an online action included in the data structure, risk decision gateway 402 may retrieve the request to perform the online action from the data structure. Additionally or alternatively, where data included in the query does not match data included in at least one request to perform an online action that is stored in the data structure, risk decision gateway 402 may forgo retrieving the at least one request to perform the online action from the data structure. For example, where data associated with an identification attribute included in the query (e.g., an identification attribute specifying a login process) does not match data associated with an identification attribute included in the query (e.g., an identification attribute specifying a reset password process), risk decision gateway 402 may forgo retrieving the at least one request to perform the online action from the data structure.

Figure 4F:
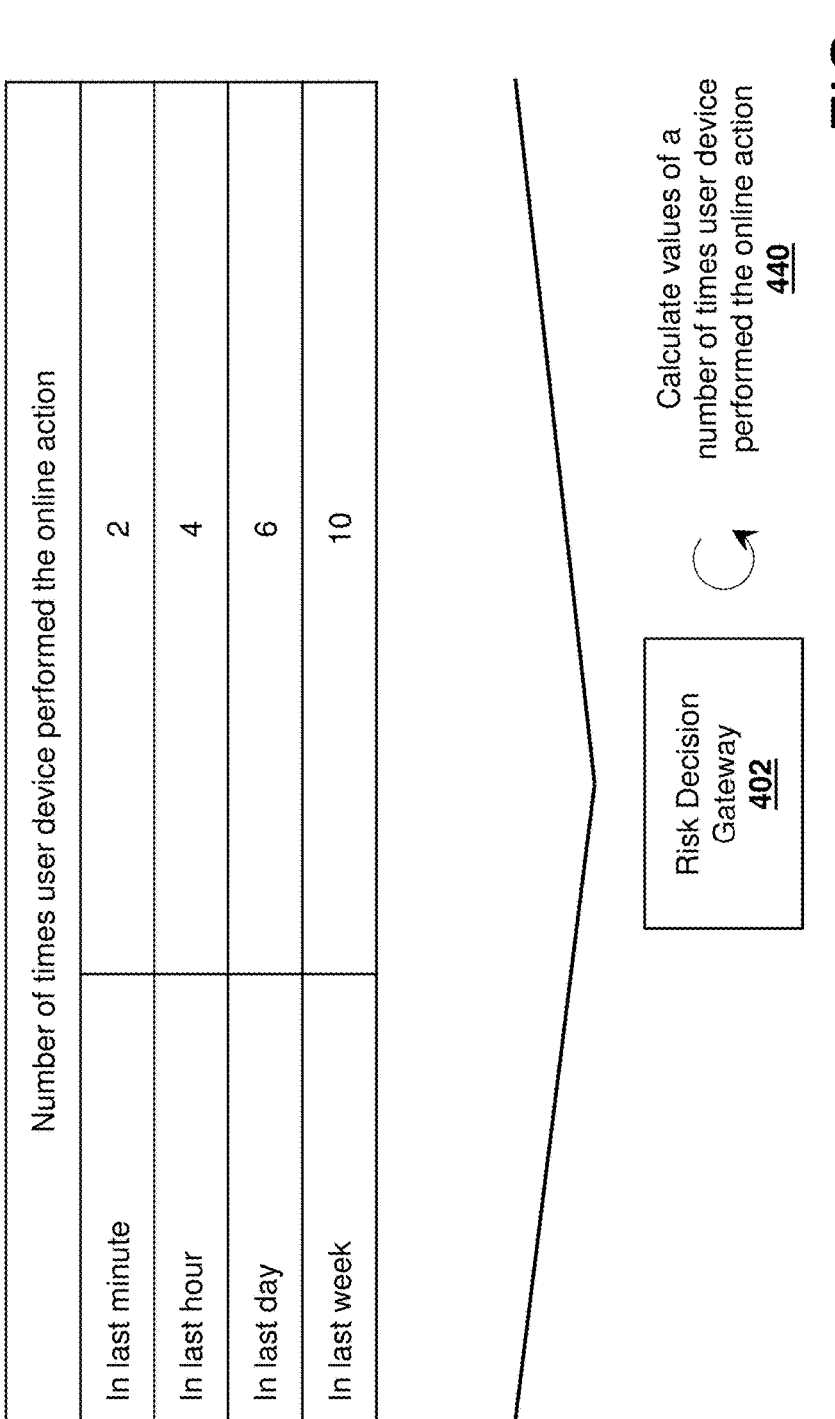

As shown by reference number 440 in FIG. 4F, risk decision gateway 402 may calculate values of a number of times user device performed the online action. For example, risk decision gateway 402 may calculate values of a number of times user device 406 performed the login process based on the data associated with a number of times the login process was performed. In such an example, the data associated with the number of times the login process was performed may include the at least one request to perform the login process that were retrieved from the data structure. In some non-limiting embodiments or aspects, risk decision gateway 402 may calculate values of a number of times user device 406 performed the online action based on the data associated with a number of times the online action was performed, where the values correspond to respective time intervals. For example, risk decision gateway 402 may calculate values of a number of times user device 406 performed the login process in the last minute, in the last hour, in the last day, in the last week, and/or the like. In some non-limiting embodiments or aspects, risk decision gateway 402 may calculate the values based on data included in at least one request to perform an online action retrieved from the data structure. For example, risk decision gateway 402 may calculate the values based on the amount of unique request identifiers included in the at least one request to perform the online action included in the data associated with the number of times the online action was performed.

Figure 4G:
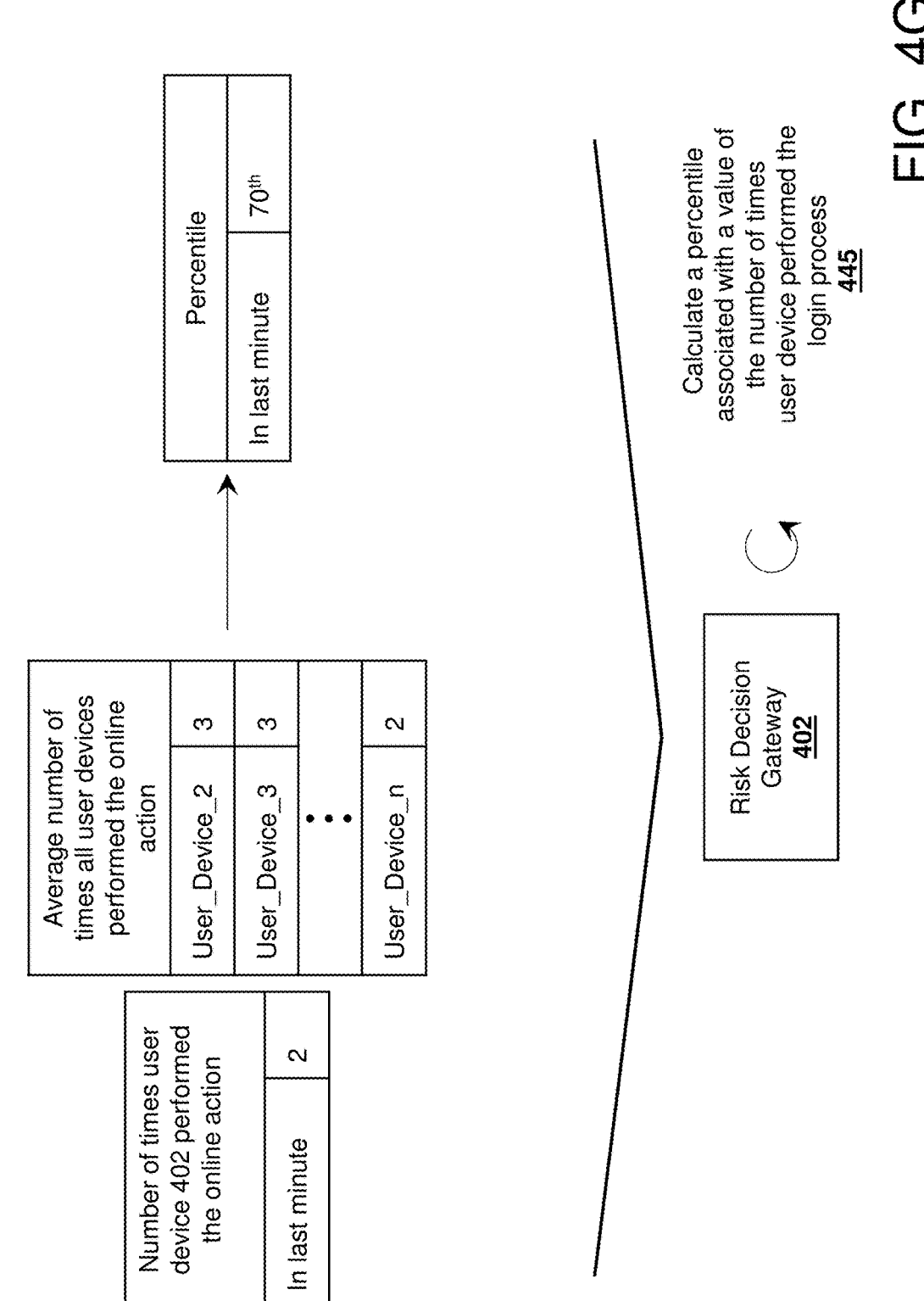

As shown by reference number 445 in FIG. 4G, risk decision gateway 402 may calculate a percentile associated with a value of the number of times user device performed the online action. For example, risk decision gateway 402 may calculate a percentile associated with a value of the number of times user device 406 performed the login process. In such an example, risk decision gateway 402 may calculate a percentile associated with a value of the number of times user device 406 performed the login process by comparing the value associated with the number of times user device 406 performed the login process with values associated with a number of times a plurality of user devices performed the login process (e.g., a plurality of user devices including user device 406 and/or a plurality of user devices not including user device 406).

As shown by reference number 450 in FIG. 4H, risk decision gateway 402 may determine whether data associated with a number of times the online action was performed is normally distributed. For example, risk decision gateway 402 may determine whether data associated with a number of times the online action was performed by user device 406 is normally distributed. Additionally or alternatively, risk decision gateway 402 may determine whether data associated with a number of times the online action was performed by a plurality of user devices is normally distributed. In such an example, the plurality of user devices may or may not include user device 406. In some non-limiting embodiments or aspects, risk decision gateway 402 may determine whether the data associated with the number of times the online action was performed is normally distributed based on a normality check method. For example, risk decision gateway 402 may determine whether the data associated with the number of times the online action was performed is normally distributed based on a chi-square validation method.

As shown by reference number 455 in FIG. 4I, risk decision gateway 402 may determine a standard deviation associated with the number of times user device performed the online action. For example, risk decision gateway 402 may determine a standard deviation associated with the number of times user device 406 performed the online action based on risk decision gateway 402 determining that the data associated with the number of times the online action was performed is normally distributed. In some non-limiting embodiments or aspects, risk decision gateway 402 may determine a standard deviation associated with the number of times user device 406 performed the online action based on at least one request to perform an online action involving user device 406. Additionally or alternatively, risk decision gateway 402 may determine a standard deviation associated with the number of times user device 406 performed the online action based on at least one request to perform an online action involving a plurality of user devices. In such an example, the plurality of user devices may or may not include user device 406. In some non-limiting embodiments or aspects, risk decision gateway 402 may determine a standard deviation associated with the number of times user device 406 performed the online action based on data included in at least one request to perform the online action.

As shown by reference number 460 in FIG. 4J, risk decision gateway 402 may determine which of a plurality of thresholds of standard deviation corresponds to the number of times user device performed the online action. For example, risk decision gateway 402 may determine which of a plurality of thresholds of standard deviation corresponds to the number of times user device 406 performed the online action based on risk decision gateway 402 comparing the number of times user device 406 performed the online action to the at least one threshold of standard deviation. In such an example, risk decision gateway 402 may determine whether at least one threshold of standard deviation of each the plurality of thresholds of standard deviation is satisfied. In some non-limiting embodiments or aspects, risk decision gateway 402 may determine the thresholds of standard deviation based on the standard deviation associated with the number of times user device 406 performed the online action. For example, risk decision gateway 402 may determine that a first threshold of standard deviation is equal to the standard deviation associated with the number of times user device 406 performed the online action multiplied by 1, that a second threshold of standard deviation is equal to the standard deviation associated with the number of times user device 406 performed the online action multiplied by 2, and/or the like.

Figure 4K:
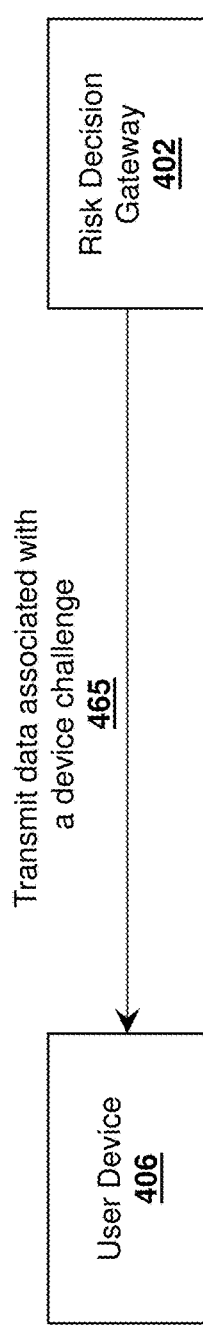

As shown by reference number 465 in FIG. 4K, risk decision gateway 402 may transmit data associated with a device challenge. For example, risk decision gateway 402 may perform a device challenge by transmitting data associated with a device challenge to user device 406. In some non-limiting embodiments or aspects, risk decision gateway 402 may perform the control operation based on risk decision gateway 402 determining that a threshold of standard deviation of the plurality of thresholds of standard deviation corresponds to the number of times user device 406 performed the online action, where the threshold of standard deviation is associated with the control operation.

Some non-limiting embodiments of the present disclosure are described herein in connection with a threshold. As described herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, and/or the like.

Although the above systems, methods, and computer program products have been described in detail for the purpose of illustration based on what is currently considered to be the most practical and preferred embodiments or aspects, it is to be understood that such detail is solely for that purpose and that the present disclosure is not limited to the described embodiments or aspects but, on the contrary, is intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect.

What is claimed is:

1. A computer-implemented method, comprising:

receiving, with at least one processor and via a communication network, a request to perform an online action, wherein the online action comprises at least one of the following:

an online action associated with a user login process;

an online action associated with a forgotten password process;

an online action associated with a purchase transaction;

an online action associated with an addition of user information to a user account; or any combination thereof; and wherein the request comprises at least one identity attribute associated with a user device of a user and an identification attribute associated with the online action;

retrieving, with at least one processor, data associated with a number of times the online action has been performed within at least one time interval, wherein retrieving the data associated with the number of times the online action has been performed within the at least one time interval comprises:

retrieving the data associated with the number of times the online action has been performed within the at least one time interval based on the at least one identity attribute associated with the user device and the identification attribute associated with the online action;

determining, with at least one processor, a standard deviation associated with the number of times the online action has been performed within the at least one time interval;

calculating, with at least one processor, at least one value associated with the number of times the online action has been performed within the at least one time interval;

determining, with at least one processor, at least one threshold of standard deviation of a plurality of thresholds of standard deviation that corresponds to the number of times the online action has been performed; and performing, with at least one processor, a control operation associated with the request to perform the online action based on the at least one threshold of standard deviation that corresponds to the number of times the online action has been performed and the at least one value associated with the number of times the online action has been performed within the at least one time interval.

2. The computer-implemented method of claim 1, wherein the at least one threshold of standard deviation comprises a value of standard deviation, and wherein the value of standard deviation is based on a measure of an amount of variation of a number of times that a plurality of user devices each performed the online action during a prior time interval.

3. The computer-implemented method of claim 1, wherein calculating the at least one value associated with the number of times the online action has been performed within the at least one time interval comprises:

calculating at least one value of a percentile associated with the number of times the online action has been performed within the at least one time interval.

4. The computer-implemented method of claim 1, further comprising:

storing the at least one value of the number of times the online action has been performed within the at least one time interval within a data structure based on calculating the at least one value of the number of times the online action has been performed within the at least one time interval.

5. The computer-implemented method of claim 1, further comprising:

determining whether a dataset associated with the number of times a plurality of user devices have performed the online action within the at least one time interval is normally distributed.

6. The computer-implemented method of claim 1, wherein receiving the request to perform the online action comprises:

receiving the request to perform the online action from a user device of a user; and wherein the control operation comprises forgoing permitting the user device of the user to perform the online action after receiving the request to perform the online action.

7. A system comprising:

at least one hardware processor programmed or configured to:

receive, via a communication network, a request to perform an online action, wherein the online action comprises at least one of the following:

an online action associated with a user login process;

an online action associated with a forgotten password process;

an online action associated with a purchase transaction;

an online action associated with an addition of user information to a user account; or any combination thereof; and wherein the request comprises at least one identity attribute associated with a user device and an identification attribute associated with the online action;

retrieve data associated with a number of times the online action has been performed within at least one time interval, wherein, when retrieving the data associated with the number of times the online action has been performed within the at least one time interval, the at least one hardware processor is programmed or configured to:

retrieve the data associated with the number of times the online action has been performed within the at least one time interval based on the at least one identity attribute associated with the user device and the identification attribute associated with the online action;

determine a standard deviation associated with the number of times the online action has been performed within the at least one time interval;

calculate at least one value associated with the number of times the online action has been performed within the at least one time interval;

determine at least one threshold of standard deviation of a plurality of thresholds of standard deviation that corresponds to the number of times the online action has been performed; and perform a control operation associated with the request to perform the online action based on the at least one threshold of standard deviation that corresponds to the number of times the online action has been performed and the at least one value associated with the number of times the online action has been performed within the at least one time interval.

8. The system of claim 7, wherein the at least one threshold of standard deviation comprises a value of standard deviation, and wherein the value of standard deviation is based on a measure of an amount of variation of a number of times that a plurality of user devices each performed the online action during a prior time interval.

9. The system of claim 7, wherein, when calculating the at least one value associated with the number of times the online action has been performed within the at least one time interval, the at least one processor is programmed or configured to:

calculate at least one value of a percentile associated with the number of times the online action has been performed within the at least one time interval.

10. The system of claim 7, wherein the at least one hardware processor is further programmed or configured to:

store the at least one value of the number of times the online action has been performed within the at least one time interval within a data structure based on calculating the at least one value of the number of times the online action has been performed within the at least one time interval.

11. The system of claim 7, wherein the at least one hardware processor is further programmed or configured to:

determine whether a dataset associated with the number of times a plurality of user devices have performed the online action within the at least one time interval is normally distributed.

12. The system of claim 7, wherein, when receiving the request to perform the online action, the at least one hardware processor is programmed or configured to:

receive the request to perform the online action from a user device of a user; and wherein the control operation comprises forgoing permitting the user device of the user to perform the online action after receiving the request to perform the online action.

13. A computer program product comprising at least one non-transitory computer-readable medium including one or more instructions that, when executed by at least one hardware processor, cause the at least one hardware processor to:

receive, via a communication network, a request to perform an online action, wherein the online action comprises at least one of the following:

an online action associated with a user login process;

an online action associated with a forgotten password process;

an online action associated with a purchase transaction;

an online action associated with an addition of user information to a user account; or any combination thereof; and wherein the request comprises at least one identity attribute associated with a user device of a user and an identification attribute associated with the online action;

retrieve data associated with a number of times the online action has been performed within at least one time interval, wherein, the one or more instructions that cause the at least one hardware processor to retrieve the data associated with the number of times the online action has been performed within the at least one time interval, cause the at least one hardware processor to:

retrieve the data associated with the number of times the online action has been performed within the at least one time interval based on the at least one identity attribute associated with the user device and the identification attribute associated with the online action;

determine a standard deviation associated with the number of times the online action has been performed within the at least one time interval;

calculate at least one value associated with the number of times the online action has been performed within the at least one time interval;

determine at least one threshold of standard deviation of a plurality of thresholds of standard deviation that corresponds to the number of times the online action has been performed; and perform a control operation associated with the request to perform the online action based on the at least one threshold of standard deviation that corresponds to the number of times the online action has been performed and the at least one value associated with the number of times the online action has been performed within the at least one time interval.

14. The computer program product of claim 13, wherein, the one or more instructions that cause the at least one hardware processor to perform the control operation associated with the request to perform the online action, cause the at least one hardware processor to:

perform the control operation associated with the request to perform the online action based on determining the standard deviation is within a predetermined Gaussian range.

15. The computer program product of claim 13, wherein, the one or more instructions that cause the at least one processor to calculate the at least one value associated with the number of times the online action has been performed within the at least one time interval, cause the at least one processor is to:

calculate at least one value of a percentile associated with the number of times the online action has been performed within the at least one time interval.

16. The computer program product of claim 13, wherein, the one or more instructions that cause the at least one hardware processor to receive the request to perform the online action, cause the at least one hardware processor to:

receive the request to perform the online action from a user device of a user; and wherein the control operation comprises forgoing permitting the user device of the user to perform the online action after receiving the request to perform the online action.

17. The computer program product of claim 13, wherein the at least one threshold of standard deviation comprises a value of standard deviation, and wherein the value of standard deviation is based on a measure of an amount of variation of a number of times that a plurality of user devices each performed the online action during a prior time interval.

* * * * *